(12) United States Patent
Hisamura et al.

(10) Patent No.: US 11,897,304 B1
(45) Date of Patent: Feb. 13, 2024

(54) STABILIZER BAR SUPPORT STRUCTURE OF OFF-ROAD VEHICLE AND OFF-ROAD VEHICLE

(71) Applicant: KAWASAKI MOTORS, LTD., Hyogo (JP)

(72) Inventors: Takashi Hisamura, Akashi (JP); Yusuke Nakashima, Akashi (JP)

(73) Assignee: Kawasaki Motors, Ltd., Hyogo (JP)

( * ) Notice: Subject to any disclaimer, the term of this patent is extended or adjusted under 35 U.S.C. 154(b) by 0 days.

(21) Appl. No.: 18/061,919

(22) Filed: Dec. 5, 2022

(51) Int. Cl.
*B60G 21/055* (2006.01)
*B60G 21/02* (2006.01)
*B60G 3/14* (2006.01)
*B62D 21/11* (2006.01)
*B60N 2/005* (2006.01)

(52) U.S. Cl.
CPC ........... *B60G 21/0551* (2013.01); *B60G 3/14* (2013.01); *B60G 21/026* (2013.01); *B60G 2202/135* (2013.01); *B60G 2204/143* (2013.01); *B60G 2300/07* (2013.01); *B60G 2800/012* (2013.01); *B60N 2/005* (2013.01); *B62D 21/11* (2013.01)

(58) Field of Classification Search
CPC .... B60G 21/0551; B60G 3/14; B60G 21/026; B60G 2202/135; B60G 2204/143; B60G 2300/07; B60G 2800/012; B60N 2/005; B62D 21/11
See application file for complete search history.

(56) References Cited

U.S. PATENT DOCUMENTS

2017/0080977 A1* 3/2017 Schroeder ............. B62D 65/12
2019/0299736 A1 10/2019 Hisamura et al.
2021/0380170 A1* 12/2021 Wilmot ................. B62D 21/11
2022/0016949 A1* 1/2022 Graus ................ B60G 17/0164

* cited by examiner

*Primary Examiner* — Jason D Shanske
*Assistant Examiner* — Matthew James O'Neill
(74) *Attorney, Agent, or Firm* — Studebaker & Brackett PC (57) ABSTRACT

A stabilizer bar support structure of an off-road vehicle includes a vehicle body frame having a seat base frame that supports a seat and a support frame that supports the seat base frame, a stabilizer bar that couples right and left suspensions to each other and is supported on the support frame, and a bracket attached to the support frame. The stabilizer bar is attached to the support frame through the bracket. The bracket receives the load of the seat base frame through the support frame.

9 Claims, 7 Drawing Sheets

LEFT ←——→ RIGHT    REAR ←——→ FRONT

FIG. 7

STABILIZER BAR SUPPORT STRUCTURE OF OFF-ROAD VEHICLE AND OFF-ROAD VEHICLE

FIELD

The technique disclosed herein relates to a stabilizer bar support structure of an off-road vehicle and an off-road vehicle.

BACKGROUND

U.S. Patent Application Publication No. 2019/0299736 discloses a stabilizer bar support structure. In this support structure, a vehicle body frame has a seat base frame that supports a seat and a support frame that supports the seat base frame. The support frame has a cutout penetrating the support frame in a vehicle width direction. A stabilizer bar penetrates the cutout, and is supported on the support frame. A lid member is attached to a rear surface of the support frame so as to close the cutout.

SUMMARY

A stabilizer bar support structure of an off-road vehicle disclosed herein includes a vehicle body frame having a seat base frame that supports a seat of the off-road vehicle and a support frame that supports the seat base frame, a stabilizer bar that couples right and left suspensions to each other and is supported on the support frame, and a bracket attached to the support frame. The stabilizer bar is attached to the support frame through the bracket, and the bracket receives the load of the seat base frame through the support frame.

An off-road vehicle disclosed herein includes a seat, a vehicle body frame having a seat base frame that supports the seat and a support frame that supports the seat base frame, a stabilizer bar that couples right and left suspensions to each other and is supported on the support frame, and a bracket attached to the support frame. The stabilizer bar is attached to the support frame through the bracket, and the bracket receives the load of the seat base frame through the support frame.

An off-road vehicle disclosed herein includes a vehicle body frame having a seat base frame that supports a seat of the off-road vehicle, and a stabilizer bar that couples right and left suspensions to each other. Each of the right and left suspensions has a trailing arm rotatably coupled to the vehicle body frame, the stabilizer bar is attached to the trailing arms of the right and left suspensions, and at least part of the stabilizer bar is located on a front side with respect to the seat base frame.

DESCRIPTION OF EMBODIMENTS

Figure 1:
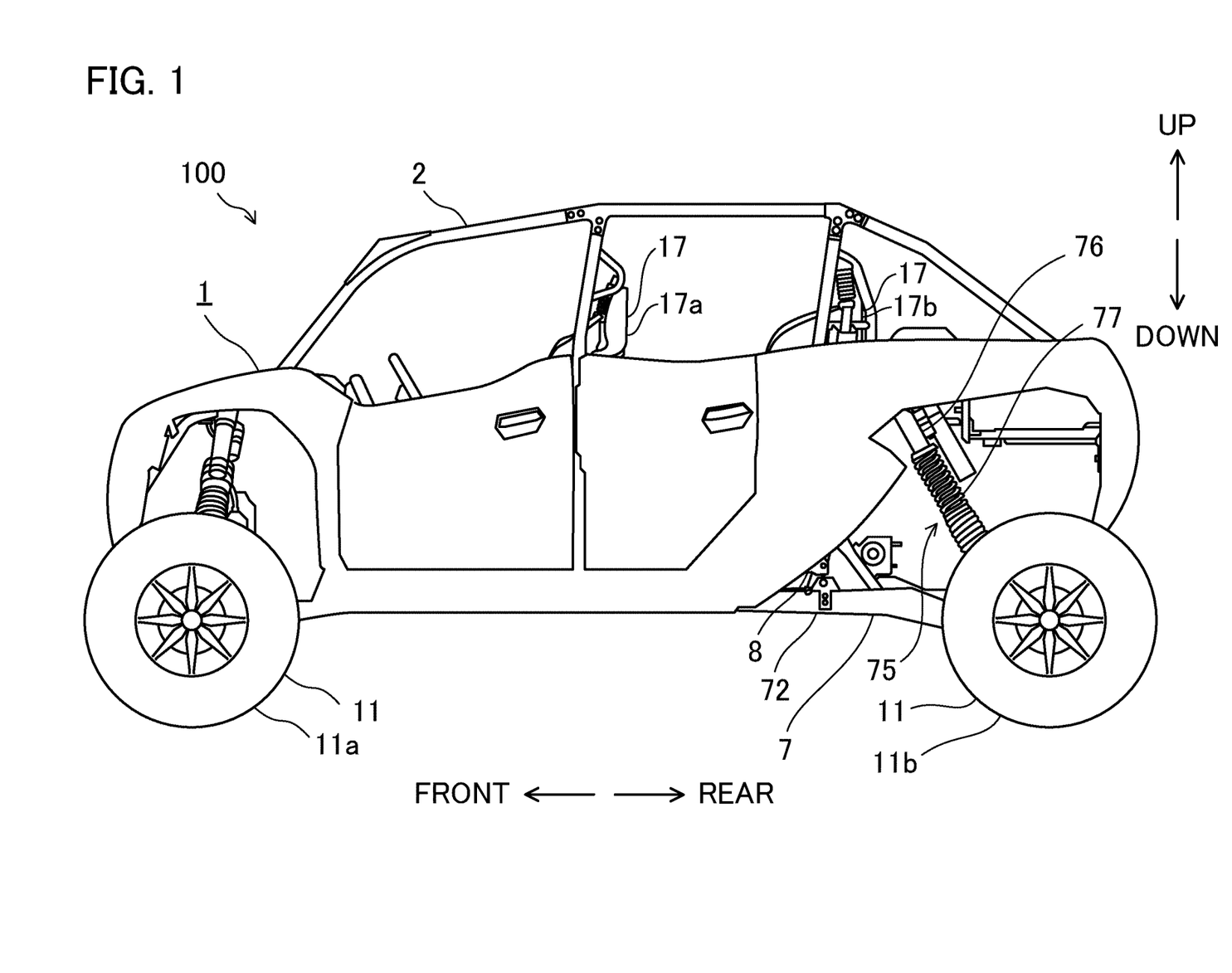
FIG. 1 is a side view of a utility vehicle.
Figure 2:
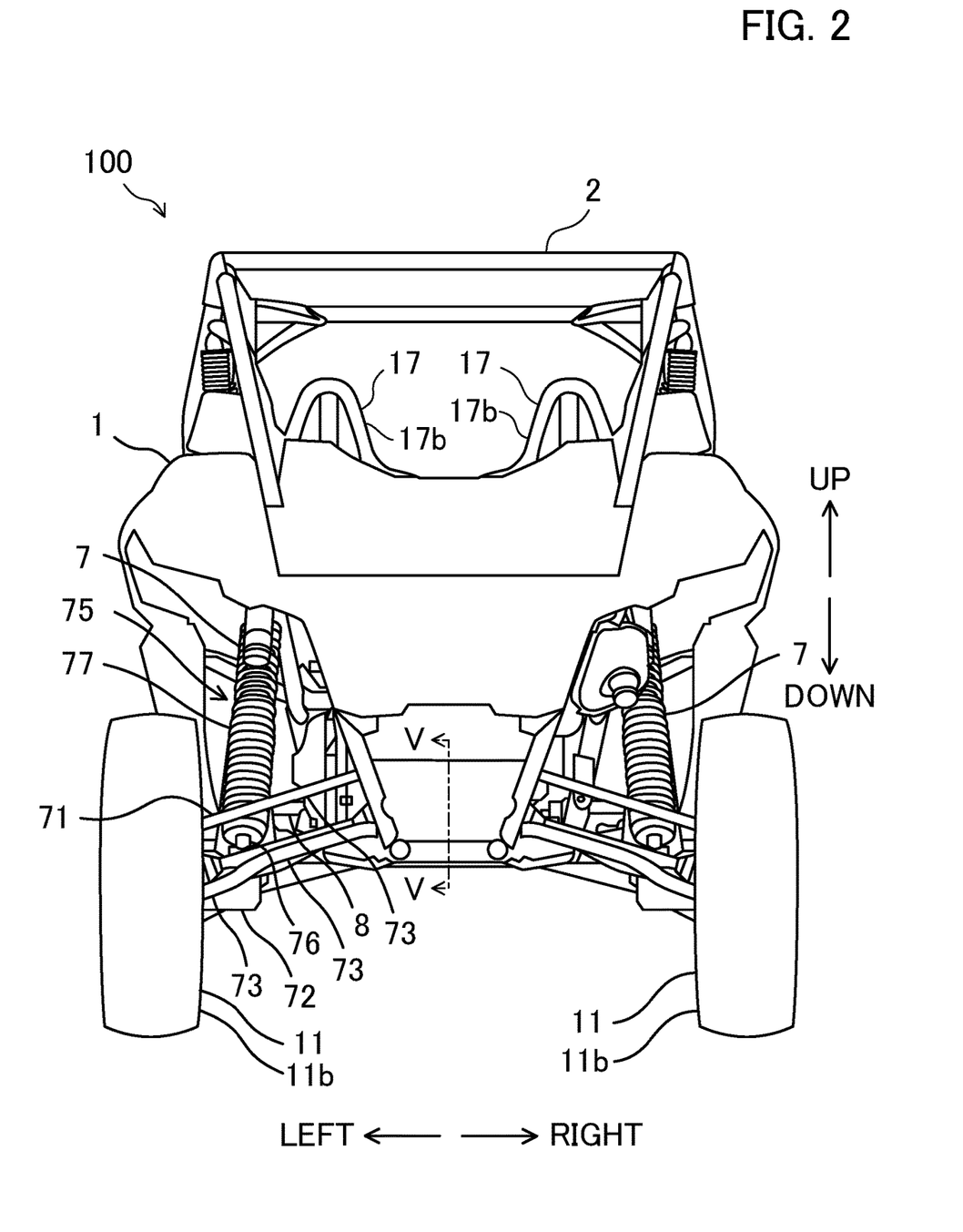
FIG. 2 is a back view of the utility vehicle.

Hereinafter, an exemplary embodiment will be described based on the drawings. FIG. 1 is a side view of a utility vehicle 100. FIG. 2 is a back view of the utility vehicle 100. The utility vehicle 100 can travel off rod. The utility vehicle 100 is one example of an off-road vehicle.

In the present disclosure, each configuration of the utility vehicle 100 will be described with reference to the directions of the utility vehicle 100. Specifically, in the present disclosure, a "front" means the front of the utility vehicle 100. The same also applies to a "rear," a "left," a "right," an "upper," and a "lower."

The utility vehicle 100 includes a body 1, a vehicle body frame 2, wheels 11, seats 17 on which occupants are to be seated, suspensions 7 that attenuate impact and vibration transmitted to the vehicle body frame 2 from the wheels 11, and a stabilizer bar 8 that reduces the roll of the utility vehicle 100.

The wheels 11 include right and left front wheels 11a and right and left rear wheels 11b. That is, the utility vehicle 100 is a four-wheeled vehicle. Note that in a case where the front wheels 11a and the rear wheels 11b are not distinguished from each other, these wheels will be merely referred to as "wheels 11." The seats 17 include front seats 17a and rear seats 17b positioned on the rear side with respect to the front seats 17a. In this example, the seats 17 include two front seats 17a aligned in the right-left direction and two rear seats 17b aligned in the right-left direction. Note that in a case where the front seats 17a and the rear seats 17b are not distinguished from each other, these seats will be merely referred to as "seats 17." The seat 17 has a seat bottom 18. The suspension 7 is a rear suspension that suspends the rear wheel 11b. The suspensions 7 are each located on the right and left sides of the vehicle body frame 2. The stabilizer bar 8 is a rear stabilizer bar coupling the right and left suspensions 7 to each other.

Figure 3:
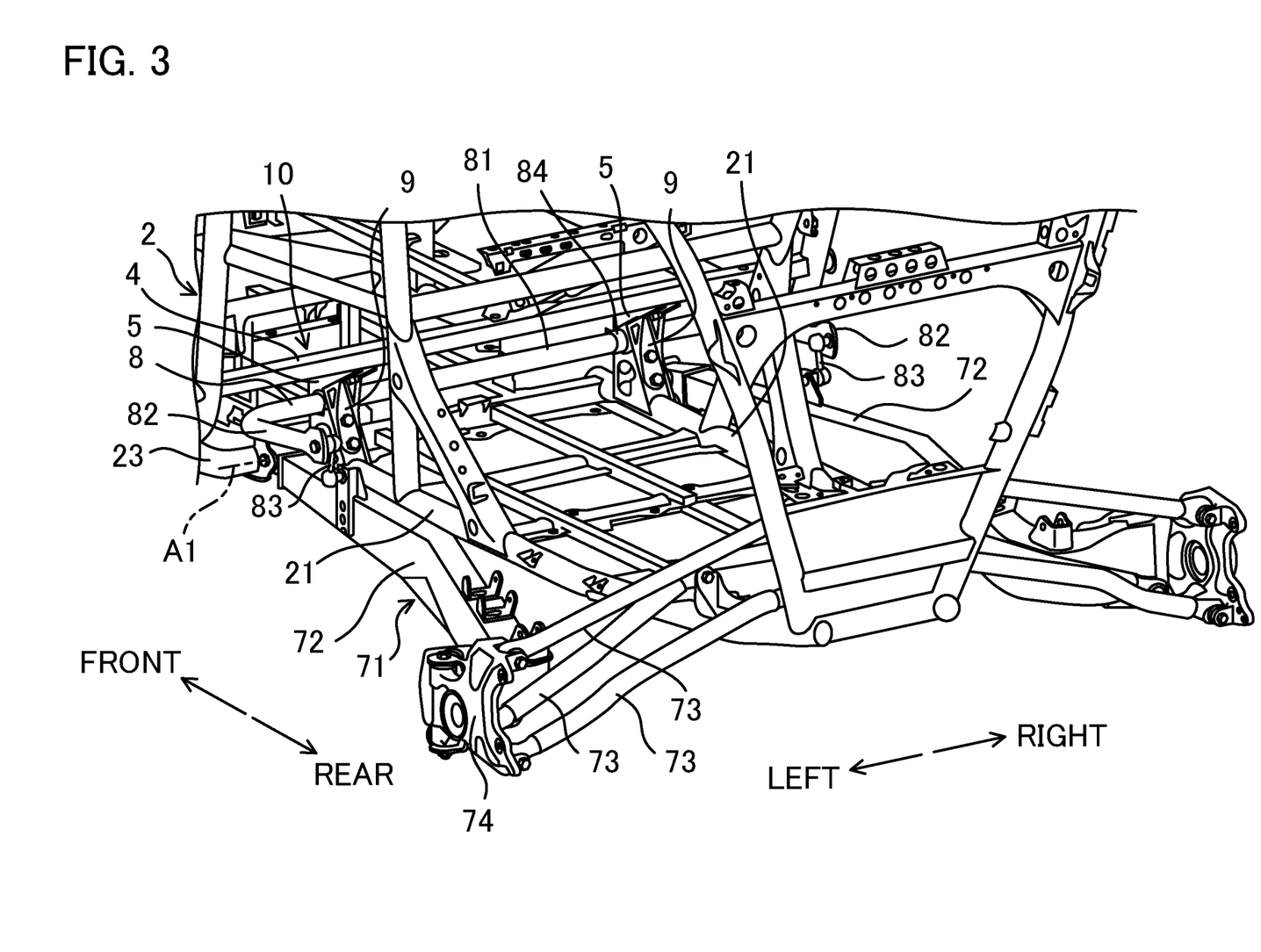
FIG. 3 is a perspective view showing a rear portion of a vehicle body frame, suspension links, and a stabilizer bar.
Figure 4:
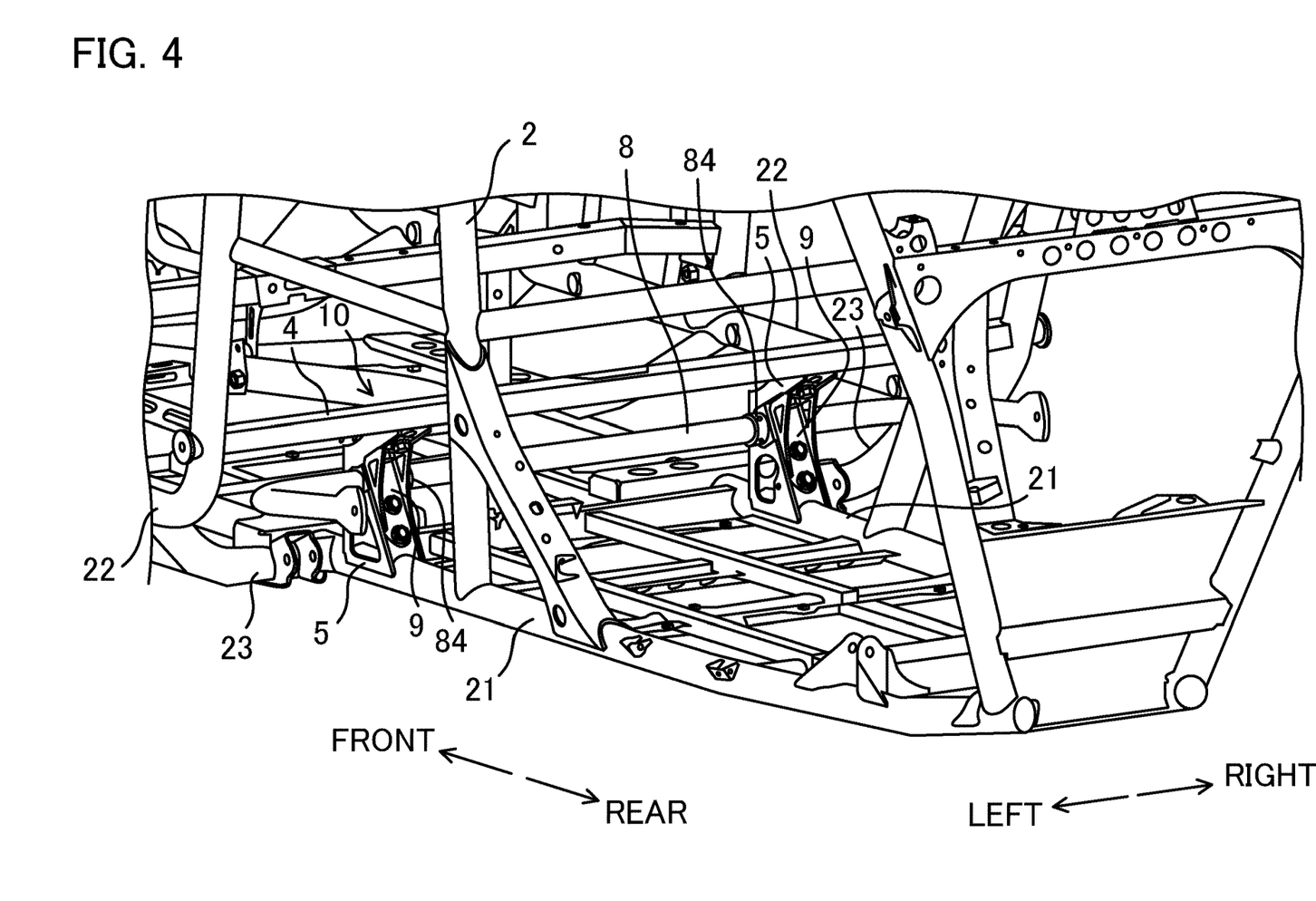
FIG. 4 is a perspective view showing the rear portion of the vehicle body frame and the stabilizer bar.
Figure 5:
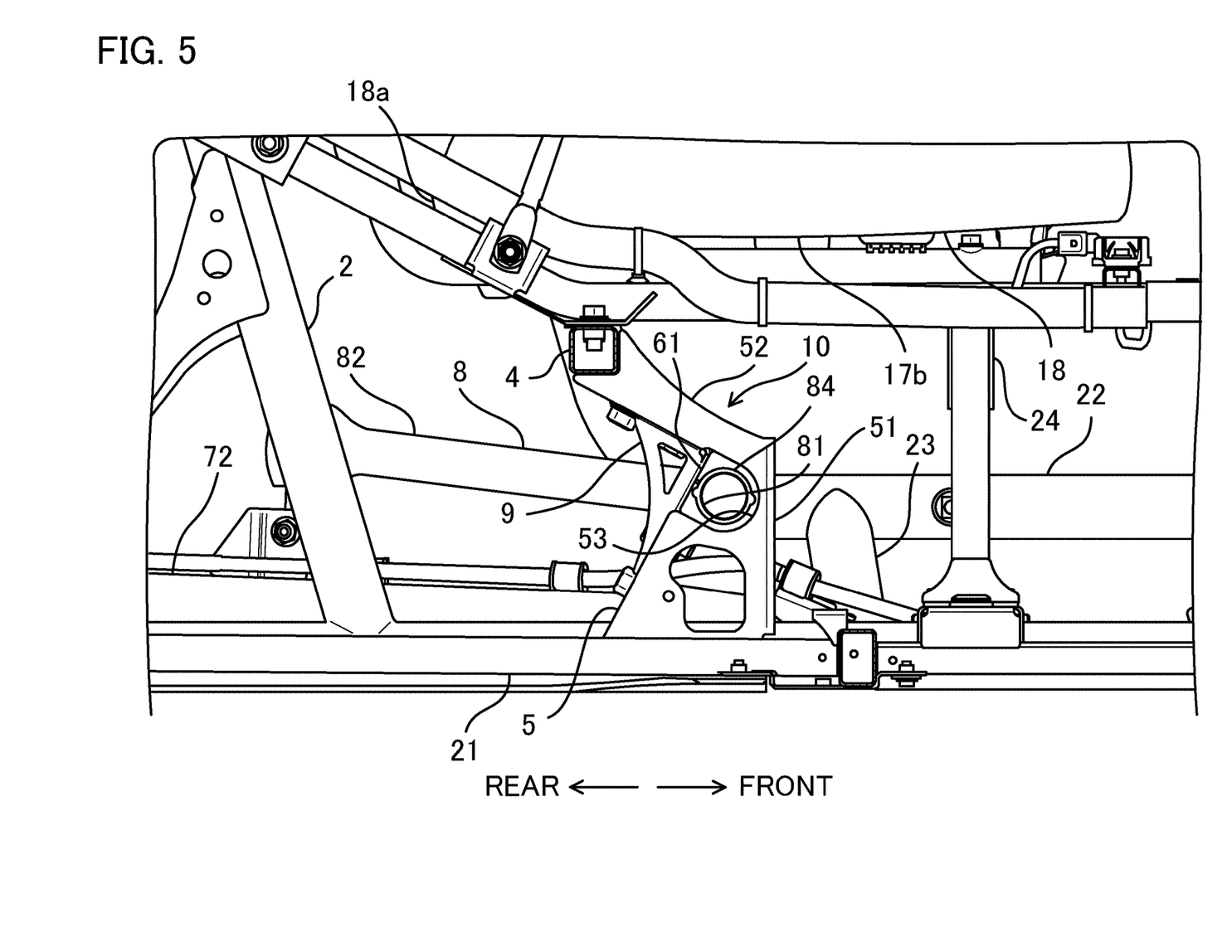
FIG. 5 is a sectional view along a V-V line of FIG. 2.

Subsequently, the vehicle body frame 2, the suspension 7, and the stabilizer bar 8 will be described in detail. FIG. 3 is a perspective view showing a rear portion of the vehicle body frame 2, suspension links 71, and the stabilizer bar 8. FIG. 4 is a perspective view showing the rear portion of the vehicle body frame 2 and the stabilizer bar 8. FIG. 5 is a sectional view along a V-V line of FIG. 2.

The vehicle body frame 2 includes a seat base frame 4 that supports the seats 17 and support frames 5 that support the seat base frame 4. The vehicle body frame 2 further includes right and left main frames 21, right and left side frames 22, and coupling frames 23 each of which couples the side frame 22 to a corresponding one of the main frames 21. Each frame of the vehicle body frame 2 is a metal pipe, for example.

The main frames 21 extend substantially in the front-rear direction in a space lower than the seats 17. The right and left main frames 21 are aligned with a gap therebetween in the right-left direction. The right and left side frames 22 are located outside the right and left main frames 21 in the right-left direction. The side frames 22 extend substantially in the front-rear direction. The coupling frame 23 extends substantially in the right-left direction to couple each side frame 22 to a corresponding one of the main frames 21. The main frames 21, the side frames 22, and the coupling frames 23 are main frames of a framework of the utility vehicle 100.

In this example, the vehicle body frame 2 includes the support frames 5. The support frames 5 are each disposed for the right and left main frames 21. The right and left support frames 5 are located substantially at the same position in the front-rear direction. The support frame 5 is a metal plate, for example. The support frame 5 is fixed to the main frame 21 by, e.g., welding. The support frame 5 extends upward from the main frame 21.

The seat base frame 4 extends substantially in the right-left direction in a space higher than the main frames 21. The seat base frame 4 is a metal pipe, for example. The seat base frame 4 is located below the seats 17, specifically the rear seats 17b. The seat base frame 4 is located on the front side with respect to rear ends 18a of the seat bottoms 18 of the rear seats 17b. The rear seats 17b are attached to the seat base frame 4 from above.

In this example, the vehicle body frame 2 further includes other seat base frames 24 that are located at the front of the seat base frame 4 to support the rear seats 17b. The seat base frame 24 extends upward from the main frame 21. Each of the seat base frame 4 and the seat base frames 24 is located below the seat bottom 18 of the rear seat 17b. The seat bottom 18 is attached to each of the seat base frame 4 and the seat base frames 24. That is, each of the seat base frame 4 and the seat base frames 24 supports the right and left rear seats 17b, specifically the seat bottoms 18.

The support frame 5 is located between the seat base frame 4 and the main frame 21. The seat base frame 4 is attached to the right and left support frames 5. Specifically, the seat base frame 4 is fixed to the support frames 5 by, e.g., welding.

The suspension 7 is an independent suspension. That is, the right and left suspensions 7 each independently suspend the right and left rear wheels 11b. The suspension 7 has the suspension link 71 that supports the rear wheel 11b such that the rear wheel 11b is movable up and down and a coilover 75 (see FIG. 1) that is located between the vehicle body frame 2 and the rear wheel 11b.

The suspension link 71 includes a trailing arm 72 that defines the position of the rear wheel 11b in the front-rear direction and control rods 73 that define the position of the rear wheel 11b in the right-left direction. The trailing arm 72 and the control rods 73 support a knuckle 74. The rear wheel 11b is rotatably attached to the knuckle 74.

The trailing arm 72 extends substantially in the front-rear direction. A front end portion of the trailing arm 72 is rotatably coupled to the vehicle body frame 2. The knuckle 74 is coupled to a rear end portion of the trailing arm 72. Specifically, the trailing arm 72 is coupled to the coupling frame 23 so as to rotate about a rotation axis A1 extending substantially in the right-left direction. The trailing arm 72 is swingable about the rotation axis A1 such that the knuckle 74 is substantially movable up and down. The rotation axis A1 is positioned on the front side with respect to the seat base frame 4.

The control rod 73 extends outward from the vehicle body frame 2 in the right-left direction. In this example, each suspension link 71 includes three control rods 73. One end portion of each control rod 73 is coupled to the vehicle body frame 2 such that the control rod 73 is rotatable about a rotation axis extending substantially in the front-rear direction. The other end portion of each control rod 73 is coupled to the knuckle 74 such that the control rod 73 is rotatable about the rotation axis extending substantially in the front-rear direction. The control rod 73 is swingable relative to the vehicle body frame 2 such that the knuckle 74 is substantially movable up and down.

In this manner, the knuckle 74 is supported on the suspension link 71 so as to move substantially in the up-down direction.

The coilover 75 includes a shock absorber 76 and a spring 77 located on the shock absorber 76 (see FIG. 2). The shock absorber 76 is an air cylinder or a hydraulic cylinder, for example. The shock absorber 76 couples the vehicle body frame 2 and the trailing arm 72 to each other. The spring 77 is a coil spring located around the shock absorber 76. The spring 77 elastically couples the vehicle body frame 2 and the trailing arm 72 to each other.

Since the knuckle 74 is supported on the suspension link 71 so as to move up and down, the rear wheel 11b moves up and down relative to the vehicle body frame 2 when receiving impact from a road surface. At this point, the shock absorber 76 and the spring 77 absorb the impact. Accordingly, vibration of the vehicle body frame 2 is reduced.

The stabilizer bar (an anti-roll bar) 8 is made of metal, for example. As shown in FIGS. 3 and 4, the stabilizer bar 8 is bent in a U-shape. The stabilizer bar 8 is attached to the right and left suspensions 7. The stabilizer bar 8 deforms so as to twist in conjunction with movement of the right and left suspensions 7. The stabilizer bar 8 is supported on the support frames 5. Specifically, the stabilizer bar 8 has a bar body 81 extending substantially in the right-left direction and arms 82 each curving from end portions of the bar body 81 in a longitudinal direction thereof.

The bar body 81 is positioned higher than the right and left main frames 21 and lower than the seat base frame 4. The arm 82 is coupled to the trailing arm 72 through a stabilizer link 83. Specifically, the left arm 82 is coupled to the left trailing arm 72 through the stabilizer link 83. The right arm 82 is coupled to the right trailing arm 72 through the stabilizer link 83. Accordingly, the trailing arms 72 of the right and left suspensions 7 are coupled to each other through the stabilizer bar 8.

The arm 82 is located so as to extend forward from a portion coupled to the trailing arm 72, i.e., the stabilizer link 83. As a result, the bar body 81 is located on the front side with respect to the portion coupled to the trailing arm 72. Part of the stabilizer bar 8, specifically the bar body 81, is located on the front side with respect to the rear ends 18a of the seat bottoms 18, and is located on the front side with respect to the seat base frame 4. The bar body 81 is supported on the right and left support frames 5. That is, the stabilizer bar 8 is coupled to the trailing arms 72 at a position on the rear side with respect to the support frames 5. The bar body 81 is supported on the support frames 5 so as to rotate about the axis thereof.

If there is a difference in a position in the up-down direction between the right and left rear wheels 11b in, e.g., turning of the utility vehicle 100, a difference in the swing angle of the trailing arm 72 with respect to the vehicle body frame 2 is caused between the right and left trailing arms 72. If there is the difference in the swing angle between the right and left trailing arms 72, the bar body 81 of the stabilizer bar 8 torsionally deforms. With elastic force generated by the torsional deformation, the stabilizer bar 8 reduces the difference in the swing angle between the right and left trailing arms 72. Accordingly, the roll of the utility vehicle 100 is reduced.

Figure 6:
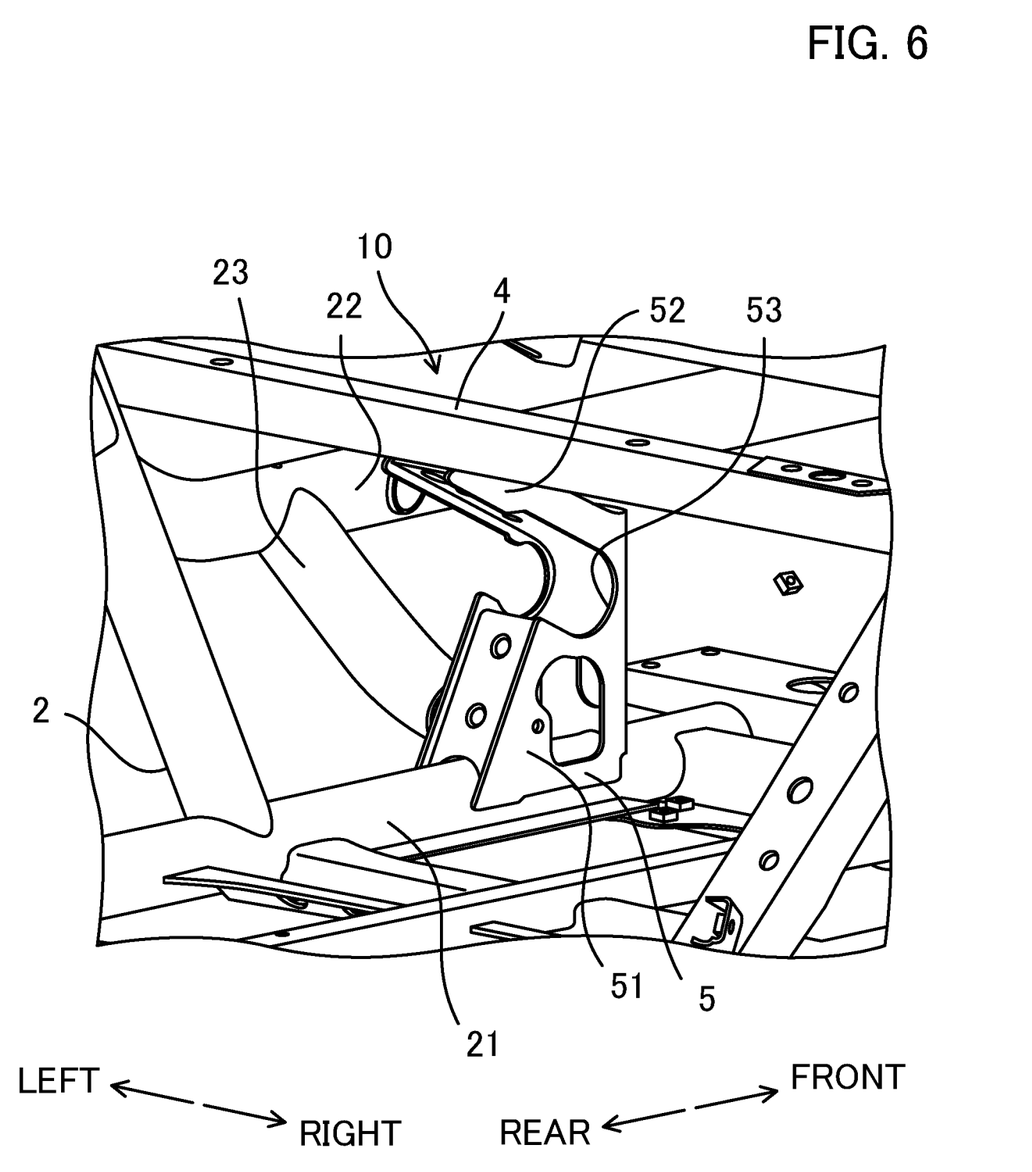
FIG. 6 is a perspective view of a support frame and the vicinity thereof without the stabilizer bar shown in the figure.
Figure 7:
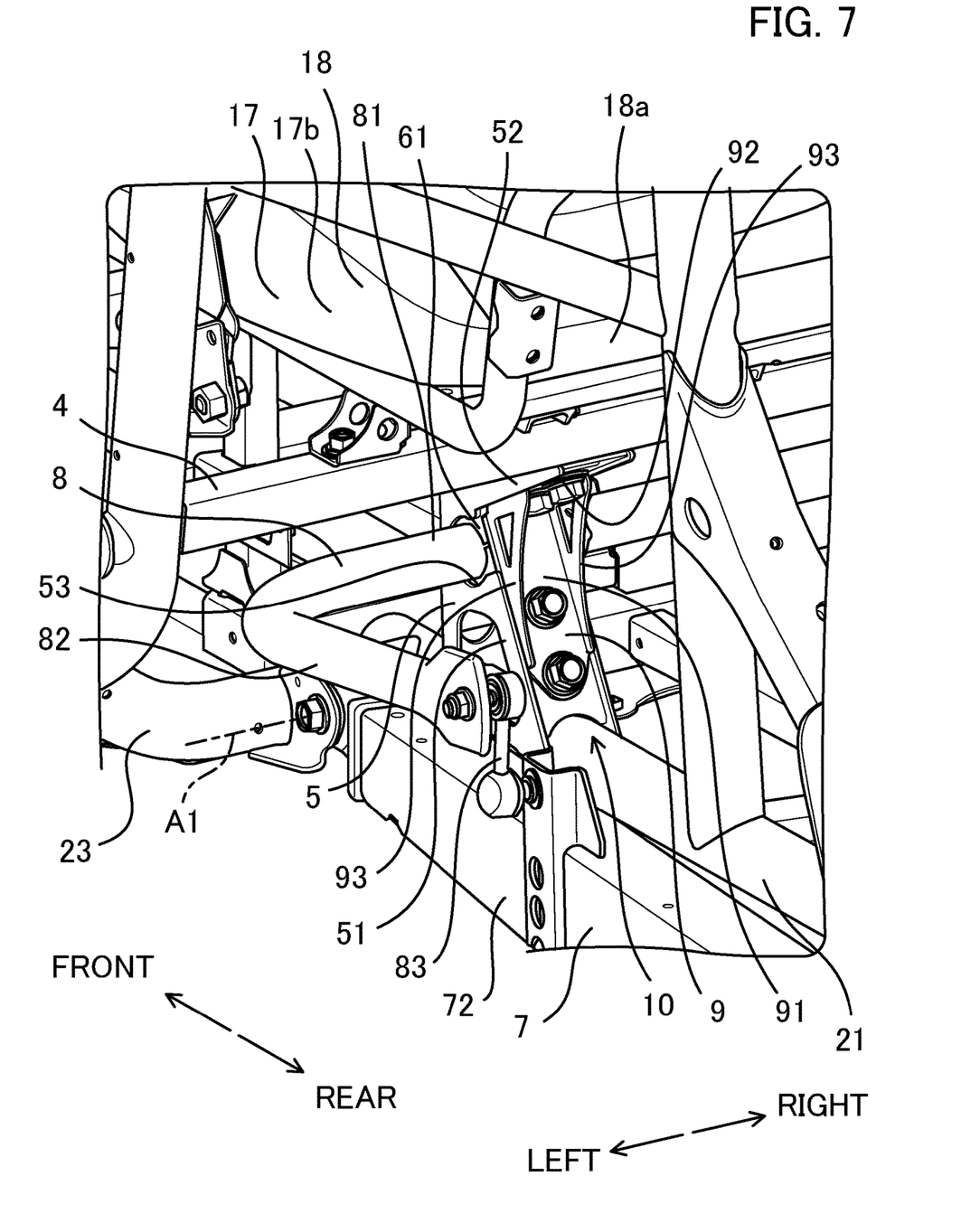
FIG. 7 is a perspective view of the support frame and the vicinity thereof.

Next, a support structure 10 for the stabilizer bar 8 will be described in detail. The support structure 10 includes, in addition to the vehicle body frame 2 and the stabilizer bar 8 as described above, brackets 9 each attached to the support frames 5. In this example, the support structure 10 includes the right and left support frames 5. The brackets 9 are each located on the support frames 5. The right and left support frames 5 have the same configuration, and the right and left brackets 9 have the same configuration. Thus, only the configuration of one of the support frames 5 and the configuration of one of the brackets 9 will be described. FIG. 6 is a perspective view of the support frame 5 and the vicinity thereof without the stabilizer bar 8 shown in the figure. FIG. 7 is a perspective view of the support frame 5 and the vicinity thereof.

The support frame 5 has a frame body 51 that supports the stabilizer bar 8 and a cantilever frame 52 that extends from the frame body 51 and supports the seat base frame 4. The frame body 51 and the cantilever frame 52 are integrated.

The frame body 51 extends substantially in the up-down direction. A lower end portion of the frame body 51 is fixed to the main frame 21 by, e.g., welding. The frame body 51 extends upward from the main frame 21. The frame body 51 has a cutout 53 in which the stabilizer bar 8 is to be fitted. The cutout 53 is in such a shape that the frame body 51 is recessed from the rear to the front. That is, the cutout 53 opens to the rear. The cutout 53 is located at a relatively-upper portion of the frame body 51.

The stabilizer bar 8 is fitted in the cutout 53. Specifically, the bar body 81 is fitted in the cutout 53. More specifically, an elastically-deformable bush 61 is wound around part of an outer peripheral surface of the bar body 81. The bush 61 is made of rubber or resin, for example. The bar body 81 is, together with the bush 61, fitted in the cutout 53. The bush 61 contacts the frame body 51, and the bar body 81 does not directly contact the frame body 51. The bar body 81 slides on the bush 61. That is, the bar body 81 is rotatable about the axis thereof. The bar body 81 penetrates the frame body 51 in the right-left direction through the cutout 53 in a state in which the bar body 81 is fitted in the cutout 53.

As shown in FIG. 4, the bar body 81 includes stoppers 84 that restrict movement of the stabilizer bar 8 in the right-left direction. In this example, the bar body 81 includes two right and left stoppers 84. The stopper 84 is in a ring shape, and is attached to the outer peripheral surface of the bar body 81. The stopper 84 protrudes outward from the outer peripheral surface of the bar body 81. The stopper 84 is fixed to the bar body 81. The left stopper 84 is located adjacent to the right side of the left support frame 5. The right stopper 84 is located adjacent to the left side of the right support frame 5. That is, the right and left stoppers 84 are located inside the right and left support frames 5 in the right-left direction. The stopper 84 contacts the adjacent bush 61, thereby restricting movement of the stabilizer bar 8 in the right-left direction.

As shown in FIG. 5 etc., the cantilever frame 52 extends from an upper end of the frame body 51. The cantilever frame 52 extends in a direction crossing the up-down direction, rearward in this example, from the frame body 51. Specifically, the cantilever frame 52 extends diagonally upward from the upper end of the frame body 51 to the rear. The seat base frame 4 is fixed to the cantilever frame 52. Specifically, the cantilever frame 52, more specifically a rear end portion of the cantilever frame 52, is fixed to lower and rear surfaces of the seat base frame 4 by welding. That is, the cantilever frame 52 supports the seat base frame 4 from below. The load of the seat base frame 4 directly acts on the cantilever frame 52.

The bracket 9 is attached to the support frame 5, and accordingly, the stabilizer bar 8 is attached to the support frame 5. Further, the bracket 9 supports the cantilever frame 52 from below, and receives the load of the seat base frame 4 through the cantilever frame 52. Specifically, as shown in FIG. 7 etc., the bracket 9 has a first portion 91 attached to the frame body 51 and a second portion 92 contacting the cantilever frame 52 from below. The first portion 91 and the second portion 92 are integrated. The second portion 92 extends so as to bend rearward from an upper end of the first portion 91. The bracket 9 may further have reinforcements 93 that couple the first portion 91 and the second portion 92 to each other. In this example, the bracket 9 has right and left reinforcements 93. The bracket 9 is a metal plate, for example.

The first portion 91 is attached to the frame body 51 so as to close the cutout 53 in a state in which the stabilizer bar 8 is fitted in the cutout 53. The first portion 91 is attached to a rear portion of the frame body 51. The first portion 91 is fixed, with a bolt, to the frame body 51 at a position lower than the cutout 53. The first portion 91 extends to the upper end of the frame body 51 so as to close the cutout 53. The first portion 91 restricts rearward movement of the bar body 81 and the bush 61. This prevents the bar body 81 and the bush 61 fitted in the cutout 53 from coming out of the cutout 53.

The second portion 92 extends along the cantilever frame 52. The second portion 92 contacts a lower portion of the cantilever frame 52. In this example, the second portion 92 is fixed to the cantilever frame 52 with a bolt. The second portion 92 supports the cantilever frame 52 from below.

The reinforcement 93 connects a side edge of the first portion 91 and a side edge of the second portion 92 to each other. Specifically, the left reinforcement 93 connects a left side edge of the first portion 91 and a left side edge of the second portion 92 to each other. The right reinforcement 93 connects a right side edge of the first portion 91 and a right side edge of the second portion 92 to each other. With the reinforcements 93, a bending angle between the first portion 91 and the second portion 92 is less likely to change. That is, the reinforcements 93 improve the entire stiffness of the bracket 9.

In this manner, the stabilizer bar 8 is attached to the right and left suspensions 7, and is supported on the support frames 5. The stabilizer bar 8 is torsionally deformable about an axis penetrating the cutout 53 of the support frame 5. Accordingly, the entire stiffness of the stabilizer bar 8 is improved.

The cutout 53 is positioned on the front side with respect to the rear end portion of the cantilever frame 52 in the front-rear direction. The vehicle body frame 2, specifically the support frames 5, supports the stabilizer bar 8 at a position on the front side with respect to the seat base frame 4. More specifically, the frame bodies 51 of the support frames 5 support the stabilizer bar 8 at a position on the front side with respect to the rear ends 18a of the seat bottoms 18 and on the front side with respect to the seat base frame 4. Since the stabilizer bar 8 is located relatively at the front, a portion of the trailing arm 72 to which the stabilizer bar 8 is coupled is also positioned relatively at the front. With this configuration, a distance between the portion of the trailing arm 72 to which the stabilizer bar 8 is coupled and the rotation axis A1 can be shortened. As the distance between the portion to which the stabilizer bar 8 is coupled and the rotation axis A1 decreases, up-down movement of the portion to which the stabilizer bar 8 is coupled in conjunction with up-down movement of the rear wheel 11b becomes smaller. Displacement of the arm 82 becomes smaller, and the torsional angle of the bar body 81 also decreases. As a result, the durability of the stabilizer bar 8 can be improved.

Since the seat base frame 4 supports the rear seats 17b, the support frames 5 are located relatively at the rear. Also in this case, the support frames 5 support the stabilizer bar 8 at the position on the front side with respect to the seat base frame 4 as described above, and accordingly, the stabilizer bar 8 can be located at the front to the extent possible.

Attachment of the stabilizer bar 8 to the support frame 5 is achieved by the bracket 9. That is, the stabilizer bar 8 is fitted in the cutout 53 of the support frame 5, and the bracket 9 is attached to the support frame 5 in a state in which the bracket 9 closes the cutout 53. The bracket 9 prevents the stabilizer bar 8 from coming out of the cutout 53. The stabilizer bar 8 can be firmly attached to the support frame 5 in a state in which the stabilizer bar 8 is fitted in the cutout 53.

The support frame 5 supports the seat base frame 4, and receives the load of the seat base frame 4. The load of the seat base frame 4 includes the weight of the seat base frame 4 itself, the weight of the rear seats 17b, the weight of the occupants on the rear seats 17b, etc. If the load of the seat base frame 4 is received only by the support frames 5, i.e., the members that support the seat base frame, a strength of supporting the seat base frame 4 is not high. In the support structure 10 of the present disclosure, the bracket 9 for attaching the stabilizer bar 8 to the support frame 5 reinforces the strength of the support frame 5 for supporting the seat base frame 4. That is, the bracket 9 is attached to the support frame 5 such that the load of the seat base frame 4 acting on the support frame 5 also acts on the bracket 9. Specifically, the cantilever frame 52 of the support frame 5 is attached to the seat base frame 4, and the load of the seat base frame 4 directly acts on the cantilever frame 52. The bracket 9 supports the cantilever frame 52 from below, and the load of the seat base frame 4 acting on the cantilever frame 52 is transmitted to the bracket 9. That is, the bracket 9 receives the load of the seat base frame 4 through the cantilever frame 52.

Since the cantilever frame 52 extends in a cantilever shape from the frame body 51, the cantilever frame 52 is easily bendable if a great load acts on the cantilever frame 52. However, the bracket 9 is attached to the frame body 51, and supports the cantilever frame 52 from below. That is, the bracket 9 is located at a corner between the frame body 51 and the cantilever frame 52, and the bracket 9 maintains a positional relationship between the frame body 51 and the cantilever frame 52 such that the cantilever frame 52 is not bent. As a result, the entire stiffness of the support frame 5 is improved.

Further, since the bracket 9 is attached to the cantilever frame 52, the load of the seat base frame 4 acting on the support frame 5 is reliably transmitted to the bracket 9.

In attachment of the bracket 9 to the frame body 51, the bracket 9 is attached to the frame body 51 so as to close the cutout 53 in which the stabilizer bar 8 is fitted. Since the frame body 51 has the cutout 53, the stiffness of the frame body 51 is partially degraded. The bracket 9 is attached to the frame body 51 so as to close the cutout 53, and therefore, the stiffness of the frame body 51 can be reinforced.

The bracket 9 is a member that attaches the stabilizer bar 8 to the support frame 5. The supporting strength of the support frame 5 is reinforced by use of the bracket 9, so that the number of components can be reduced. Further, the support frame 5 that supports the seat base frame 4 also supports the stabilizer bar 8, so that the number of components can also be reduced on this point.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment.

The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

The technique of the present disclosure is also applicable to a support structure for a front stabilizer that couples right and left front suspensions.

The off-road vehicle is not limited to the utility vehicle 100, and may be, for example, an all terrain vehicle (ATV) or a tractor. The number of wheels on the utility vehicle 100 is not limited. For example, the utility vehicle 100 may be a three-wheeled vehicle.

The number of seats on the utility vehicle 100 is not limited. For example, the utility vehicle 100 may include only one front seat 17a and one rear seat 17b, or may include only one seat.

The sizes, shapes, materials, etc. of the body 1, the vehicle body frame 2, the seat base frame 4, the support frame 5, the suspension 7, the stabilizer bar 8, and the bracket 9 are not limited.

The seat base frame 4 may support only one rear seat 17b or one front seat 17a, or may support both the front seat 17a and the rear seat 17b. The seat base frames 24 may be omitted. That is, the seat 17 may be supported only on the seat base frame 4.

The suspension 7 may have, instead of the coilover 75, a shock absorber and a spring located separately from the shock absorber. The suspension 7 does not necessarily include the trailing arm 72.

The stabilizer bar 8 may couple front end portions of the right and left trailing arms 72 to each other. The stabilizer bar 8 may couple axles of the right and left wheels to each other.

In this example, only part of the stabilizer bar 8 is located on the front side with respect to the rear ends 18a of the seat bottoms 18, but the entirety of the stabilizer bar 8 may be located on the front side with respect to the rear ends 18a. That is, at least part of the stabilizer bar 8 may only be required to be located on the front side with respect to the rear ends 18a. Moreover, in this example, only part of the stabilizer bar 8 is located on the front side with respect to the seat base frame 4, but the entirety of the stabilizer bar 8 may be located on the front side with respect to the seat base frame 4. That is, at least part of the stabilizer bar 8 may only be required to be located on the front side with respect to the seat base frame 4. The stabilizer bar 8 may be located on the rear side with respect to the seat base frame 4. The stabilizer bar 8 may be located on the rear side with respect to the rear ends 18a of the seat bottoms 18.

The number of support frames 5 of the vehicle body frame 2 is not limited. The vehicle body frame 2 may have only one support frame 5 or three or more support frames 5. The support frame 5 may be located at a frame of the vehicle body frame 2 other than the main frame 21. The member that supports the stabilizer bar 8 on the vehicle body frame 2 is not limited to the support frame 5.

The number of brackets 9 of the support structure 10 is changeable according to the number of support frames 5 of the vehicle body frame 2. The location where the bracket 9 is attached to the support frame 5 is not limited. The bracket 9 may be attached only to the frame body 51 or the cantilever frame 52. The support frame 5 does not necessarily have the cutout 53. In this case, the stabilizer bar 8 is, for example, attached to the support frame 5 with sandwiched between the support frame and the bracket attached thereto.

The summary of the technique of the present disclosure is as follows.

[1] The support structure 10 for the stabilizer bar 8 of the utility vehicle 100 (the off-road vehicle) includes the vehicle body frame 2 having the seat base frame 4 that supports the seats 17 and the support frames 5 that support the seat base frame 4, the stabilizer bar 8 that couples the right and left suspensions 7 to each other and is supported on the support frames 5, and the brackets 9 attached to the support frames 5. The stabilizer bar 8 is attached to the support frame 5 through the bracket 9, and the bracket 9 receives the load of the seat base frame 4 through the support frame 5.

According to this configuration, the bracket 9 receives the load of the seat base frame 4 through the support frame 5, so that the strength of the support frame 5 for supporting the seat base frame 4 can be reinforced. Moreover, the supporting strength of the support frame 5 is reinforced using the bracket 9 that attaches the stabilizer bar 8 to the support frame 5, and therefore, the number of components can be reduced.

[2] In the support structure 10 for the stabilizer bar 8 of the utility vehicle 100 according to [1], the support frame 5 has the frame body 51 that supports the stabilizer bar 8 and the cantilever frame 52 that extends from the frame body 51 and supports the seat base frame 4. The bracket 9 supports the cantilever frame 52 from below, and receives the load of the seat base frame 4 through the cantilever frame 52.

According to this configuration, the cantilever frame 52 supporting the seat base frame 4 is supported on the bracket 9 from below, and therefore, the load of the seat base frame 4 can be reliably transmitted to the bracket 9. Thus, the strength of the support frame 5 for supporting the seat base frame 4 can be reliably reinforced by the bracket 9.

[3] In the support structure 10 for the stabilizer bar 8 of the utility vehicle 100 according to [1] or [2], the frame body 51 has the cutout 53 in which the stabilizer bar 8 is to be fitted, and the bracket 9 is attached to the frame body 51 so as to close the cutout 53 in a state in which the stabilizer bar 8 is fitted in the cutout 53.

According to this configuration, the bracket 9 can prevent the stabilizer bar 8 from coming out of the cutout 53, and the stabilizer bar 8 can be firmly attached to the support frame 5 in a state in which the stabilizer bar 8 is fitted in the cutout 53. Moreover, the stiffness of the frame body 51 having the cutout 53 can be reinforced by the bracket 9.

[4] In the support structure 10 for the stabilizer bar 8 of the utility vehicle 100 according to any one of [1] to [3], each of the right and left suspensions 7 has the trailing arm 72 rotatably coupled to the vehicle body frame 2, the stabilizer bar 8 is attached to the trailing arms 72 of the right and left suspensions 7, the cantilever frame 52 extends rearward from the frame body 51, and the frame body 51 supports the stabilizer bar 8 on the front side with respect to the seat base frame 4.

According to this configuration, the portion of the trailing arm 72 to which the stabilizer bar 8 is coupled can be located relatively at the front, and the distance between the portion of the trailing arm 72 coupled to the stabilizer bar 8 and the rotation axis A1 of the trailing arm 72 can be shortened. Thus, up-down movement of the portion to which the stabilizer bar 8 is coupled in conjunction with up-down movement of the wheel 11 can be smaller, and the torsional angle of the stabilizer bar 8 can be reduced. Consequently, the durability of the stabilizer bar 8 can be improved.

[5] In the support structure 10 for the stabilizer bar 8 of the utility vehicle 100 according to any one of [1] to [4], the seats 17 of the utility vehicle 100 include the front seats 17a and the rear seats 17b, and the seat base frame 4 supports the rear seats 17b.

According to this configuration, the support frame 5 supports the seat base frame 4 that supports the rear seats 17b, and therefore, is located relatively at the rear. However, also in this case, the support frame 5 supports the stabilizer bar 8 at the position on the front side with respect to the seat base frame 4, and therefore, the stabilizer bar 8 can be located at the front to the extent possible.

[6] In the support structure 10 for the stabilizer bar 8 of the utility vehicle 100 according to any one of [1] to [5], each of the right and left suspensions 7 has the trailing arm 72 rotatably coupled to the vehicle body frame 2, the stabilizer bar 8 is attached to the trailing arms 72 of the right and left suspensions 7, and the support frame 5 supports the stabilizer bar 8 on the front side with respect to the seat base frame 4.

According to this configuration, the portion of the trailing arm 72 to which the stabilizer bar 8 is coupled can be located relatively at the front, and the distance between the portion of the trailing arm 72 to which the stabilizer bar 8 is coupled and the rotation axis A1 of the trailing arm 72 can be shortened. Thus, up-down movement of the portion to which the stabilizer bar 8 is coupled in conjunction with up-down movement of the wheel can be smaller, and the torsional angle of the stabilizer bar 8 can be reduced. Consequently, the durability of the stabilizer bar 8 can be improved.

[7] The utility vehicle 100 (the off-road vehicle) includes the seats 17, the vehicle body frame 2 having the seat base frame 4 that supports the seats 17 and the support frames 5 that support the seat base frame 4, the stabilizer bar 8 that couples the right and left suspensions 7 to each other and is supported on the support frames 5, and the brackets 9 attached to the support frames 5. The stabilizer bar 8 is attached to the support frames 5 through the brackets 9, and the bracket 9 receives the load of the seat base frame 4 through the support frame 5.

According to this configuration, the bracket 9 receives the load of the seat base frame 4 through the support frame 5, so that the strength of the support frame 5 for supporting the seat base frame 4 can be reinforced by the bracket 9. Moreover, the supporting strength of the support frame 5 is reinforced using the bracket 9 that attaches the stabilizer bar 8 to the support frame 5, and therefore, the number of components can be reduced.

[8] The utility vehicle 100 (the off-road vehicle) includes the vehicle body frame 2 having the seat base frame 4 that supports the seats 17, and the stabilizer bar 8 that couples the right and left suspensions 7 to each other. Each of the right and left suspensions 7 has the trailing arm 72 rotatably coupled to the vehicle body frame 2, the stabilizer bar 8 is attached to the trailing arms 72 of the right and left suspensions 7, and at least part of the stabilizer bar 8 is located on the front side with respect to the seat base frame 4.

According to this configuration, the portion of the trailing arm 72 to which the stabilizer bar 8 is coupled can be located relatively at the front, and the distance between the portion of the trailing arm 72 to which the stabilizer bar 8 is coupled and the rotation axis A1 of the trailing arm 72 can be shortened. Thus, up-down movement of the portion to which the stabilizer bar 8 is coupled in conjunction with up-down movement of the wheel can be smaller, and the torsional angle of the stabilizer bar 8 can be reduced. Consequently, the durability of the stabilizer bar 8 can be improved.

[9] In the utility vehicle 100 according to [8], the vehicle body frame 2 further includes the support frames 5, and the support frame 5 has the frame body 51 that supports the stabilizer bar 8 on the front side with respect to the seat base frame 4 and the cantilever frame 52 that extends rearward from the frame body 51 and supports the seat base frame 4.

According to this configuration, the cantilever frame 52 can support the seat base frame 4 while the frame body 51 supports the stabilizer bar 8 on the front side with respect to the seat base frame 4.

[10] In the utility vehicle 100 according to [8] or [9], the seats 17 of the utility vehicle 100 include the front seats 17a and the rear seats 17b, the rear seat 17b includes the seat bottom 18, the seat base frame 4 supports the seat bottoms 18, and at least part of the stabilizer bar 8 is located on the front side with respect to the rear ends 18a of the seat bottoms 18.

According to this configuration, the support frame 5 supports the seat base frame 4 that supports the rear seats 17b, and therefore, is located relatively at the rear. However, also in this case, the stabilizer bar 8 can be located at the front to the extent possible, and the durability of the stabilizer bar 8 can be improved.

What is claimed:

1. A stabilizer bar support structure of an off-road vehicle, comprising:
   a vehicle body frame including a seat base frame that supports a seat and a support frame that supports the seat base frame;
   a stabilizer bar that couples right and left suspensions to each other and is supported on the support frame; and
   a bracket attached to the support frame,
   wherein the support frame has a frame body that supports the stabilizer bar and a cantilever frame that extends from the frame body and supports the seat base frame,
   the stabilizer bar is attached to the support frame through the bracket, and
   the bracket supports the cantilever frame from below, and receives a load of the seat base frame through the cantilever frame.

2. The stabilizer bar support structure of the off-road vehicle according to claim 1, wherein
   the frame body has a cutout in which the stabilizer bar is to be fitted, and
   the bracket is attached to the frame body so as to close the cutout in a state in which the stabilizer bar is fitted in the cutout.

3. The stabilizer bar support structure of the off-road vehicle according to claim 1, wherein
   each of the right and left suspensions has a trailing arm rotatably coupled to the vehicle body frame,
   the stabilizer bar is attached to the trailing arms of the right and left suspensions,
   the cantilever frame extends rearward from the frame body, and
   the frame body supports the stabilizer bar on a front side with respect to the seat base frame.

4. The stabilizer bar support structure of the off-road vehicle according to claim 3, wherein
   the seat includes a front seat and a rear seat, and
   the seat base frame supports the rear seat.

5. The stabilizer bar support structure of the off-road vehicle according to claim 1, wherein
   each of the right and left suspensions has a trailing arm rotatably coupled to the vehicle body frame,
   the stabilizer bar is attached to the trailing arms of the right and left suspensions, and
   the support frame supports the stabilizer bar on a front side with respect to the seat base frame.

6. An off-road vehicle comprising:
   a seat;
   a vehicle body frame including a seat base frame that supports the seat and a support frame that supports the seat base frame;
   a stabilizer bar that couples right and left suspensions to each other and is supported on the support frame; and
   a bracket attached to the support frame,
   wherein the support frame has a frame body that supports the stabilizer bar and a cantilever frame that extends from the frame body and supports the seat base frame,
   the stabilizer bar is attached to the support frame through the bracket, and
   the bracket supports the cantilever frame from below, and receives a load of the seat base frame through the cantilever frame.

7. An off-road vehicle comprising:
   a vehicle body frame including a seat base frame that supports a seat; and
   a stabilizer bar that couples right and left suspensions to each other,
   wherein the seat includes a seat bottom supported by the seat base frame,
   each of the right and left suspensions has a trailing arm rotatably coupled to the vehicle body frame,
   the stabilizer bar is attached to the trailing arms of the right and left suspensions, and
   at least part of the stabilizer bar is located on a rear side with respect to a front end of the seat bottom and on a front side with respect to a rear end of the seat bottom.

8. The off-road vehicle according to claim 7, wherein
   the vehicle body frame further includes a support frame, and
   the support frame has a frame body that supports the stabilizer bar on a front side with respect to the seat base frame and a cantilever frame that extends rearward from the frame body and supports the seat base frame.

9. The off-road vehicle according to claim 7, wherein
   the seat includes a front seat and a rear seat,
   the rear seat includes the seat bottom, and
   at least part of the stabilizer bar is located on a front side with respect to the seat base frame.

* * * * *